3,197,883
DRYING OF WET SOLID SODIUM CYANIDE
Erwin Hartert and Hans Georg Schwarz, both of Ludwigshafen am Rhine, Germany, assignors to Badische Anilin- & Soda-Fabrik Aktiengesellschaft, Ludwigshafen am Rhine, Germany
Filed Oct. 24, 1961, Ser. No. 147,142
Claims priority, application Germany, Oct. 29, 1960, B 59,917
5 Claims. (Cl. 34—10)

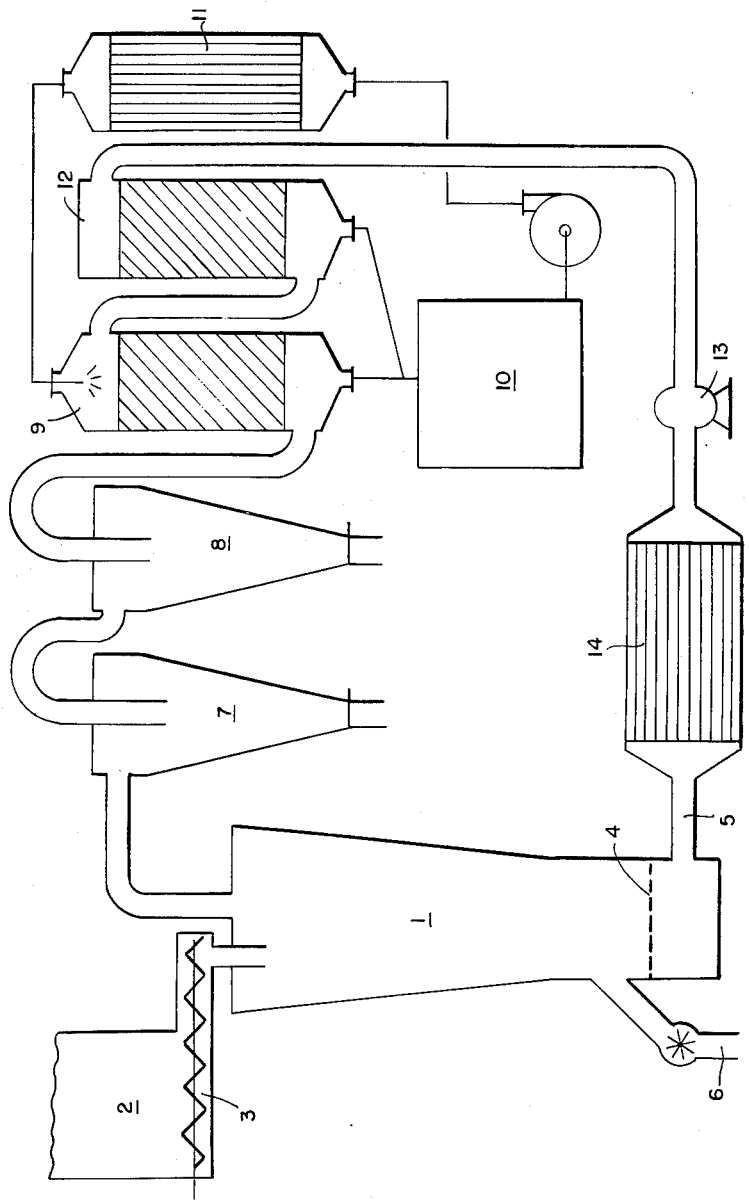
Aug. 3, 1965  E. HARTERT ETAL  3,197,883
DRYING OF WET SOLID SODIUM CYANIDE
Filed Oct. 24, 1961
INVENTORS:
ERWIN HARTERT
HANS GEORG SCHWARZ
BY
ATT'YS

United States Patent Office 3,197,883
Patented Aug. 3, 1965

This invention relates to a process for drying wet solid sodium cyanide. More particularly, the invention relates to a process for drying wet solid sodium cyanide by finely distributing the salt in a hot air stream.

It is known that sodium cyanide can be prepared by causing hydrocyanic acid to react with aqueous sodium hydroxide solution and concentrating the resultant aqueous sodium cyanide solution until solid salt precipitates. The solid salt is then separated from the mother liquor, for example by means of a centrifuge. Drying of wet sodium cyanide obtained in this manner presents considerable difficulties because the salt tends to hydrolyze, especially at elevated temperatures.

Several processes are known which aim at producing anhydrous sodium cyanide while substantially avoiding hydrolysis of the salt. These methods cannot, however, be regarded as satisfactory because the products obtained are always more or less heavily contaminated.

It is known to produce solid sodium cyanide by atomizing aqueous solutions thereof in a preheated air stream which has been freed from carbon dioxide. Since, however, absolutely pure hydrocyanic acid is not available in commercial quantities and the cyanide solutions obtained are therefore necessarily contaminated by carbonate, formate and other by-products, and since moreover the cyanide solutions should contain a residual amount of about ½% by weight of sodium hydroxide solution to suppress decomposition, sodium cyanide of highest purity cannot be prepared by this method.

In another known process, the drying of moist sodium cyanide is carried out in two stages. In the first stage, the salt is dried to a water content of about 10% in a screw mixer by means of air at about 370° C. This moisture content is then reduced in a revolving drum to a residual content of about 2%, again by means of hot air. However, the material cannot be dried further by this process if decomposition of the sodium cyanide with formation of sodium formate is to be avoided.

According to another known process, wet sodium cyanide is dried by heating the material to temperatures up to about 500° C., the charge passing through the temperature range of 80° to 150° C. within 20 minutes at the most. Operation of this process is relatively complicated in that it involves spreading the salt on trays or filling it into iron boats. The purity of the sodium cyanide obtained is only 97 to 98%.

We have found that very pure and practically anhydrous sodium cyanide is obtained by finely distributing and drying wet solid sodium cyanide in an air stream having a temperature of up to 500° C., preferably of 100° to 200° C.

The drying process according to the present invention can be carried out, for example, in an air-suspension dryer, in a flash dryer or, preferably, in a fluidized-bed dryer. During start-up of the fluidized-bed dryer, it is expedient to use dried material as the feed because even when the water content is as low as 1%, the sodium cyanide will adhere firmly to the walls and, moreover, the fluidized bed will be adversely affected by the formation of channels. In continuous operation, the average water content of the salt in the fluidized bed is kept below 0.5%, preferably below 0.1%, by suitably controlling the feed of moist salt and adjusting the withdrawal of dried material from the fluidized bed accordingly.

The process of the invention renders it possible to treat the sodium cyanide in the fluidized bed at temperatures above 100% C. without decomposition being observed. In order to obtain a pure product, the air used for drying should be free from carbon dioxide.

For this purpose, it is expedient to recycle the drying air. After leaving the fluidized-bed dryer, the air is freed from entrained dust in a cyclone and then washed with alkaline solution in a scrubber to remove the water vapor. Scrubbing is advantageously effected by means of sodium hydroxide solution which has a concentration of 30 to 50% by weight and is maintained at room temperature by cooling with water. The sodium hydroxide solution, which becomes diluted during the process, is readjusted at suitable intervals to its original concentration by adding solution of higher concentration, or is replaced completely by fresh solution of the desired concentration. The spent solution can be used for the production of sodium cyanide solutions by reaction with hydrocyanic acid or with gases containing hydrogen cyanide. The purified air is reheated and recycled into the dryer. Recycling of the air offers the double advantage that the air required for fluidization is practically free from carbon dioxide and that no air is emitted which could poison the surrounding atmosphere by the cyanide dust contained therein.

The process of the invention is suitable for drying sodium cyanide with water contents of up to 50%. It is thus possible to convert, for example, the dihydrate of sodium cyanide into anhydrous, finely powdered sodium cyanide which is practically free from decomposition products.

The invention will be further illustrated by, but is not limited to, the following example.

Example 150 m.³/hr. of air, which has been heated to 140° C. in a heat exchanger, is passed into a fluidized-bed dryer of 50 cm. diameter by means of a blower. Sodium cyanide with a water content of 6%, which has been obtained by centrifuging a concentrated slurry, is introduced uniformly at a rate of 60 kg./hr. An equivalent amount of dried salt is withdrawn from the dryer through a laterally disposed nozzle. The air leaving the dryer is passed through two cyclones for separation of entrained dust and then to a scrubber where the absorbed water vapor is separated by means of sodium hydroxide solution. The concentration of the sodium hydroxide solution is kept at about 40% NaOH, and its temperature is maintained at about 25° C. The air thus purified is returned to the dryer. The product withdrawn from the dryer has a sodium cyanide content of 99%; its water content does not exceed 0.1%.

Similar results are obtained when wet sodium cyanide is dried in a flash dryer or air-suspension dryer by treatment with air heated to temperatures up to 500° C.

The process aforedescribed can be conducted, for example, in an assembly of chemical processing equipment illustrated in the drawing, wherein:

The figure is a semidiagrammatic view of a fluid bed dryer for drying the moist, solid sodium cyanide and a gas recycling system and other components employed in association therewith.

Referring to the drawing, moist sodium cyanide is supplied from a hopper 2 to the top of a fluidized-bed dryer 1 by means of a worm 3. Hot, dried air is introduced into the dryer through line 5. Before entering the drying chamber proper, the air passes through a sieve plate 4. Dry salt is withdrawn from the dryer through line 6 in amounts depending on the speed of drying, which in turn depends on, inter alia, the water content of the moist salt, the temperature of the air used for drying and the feed of moist salt. The air leaving the dryer is freed from entrained dust in cyclones 7 and 8 and then washed with caustic soda solution in a packed tower 9. For this purpose the caustic soda solution is pumped from a vessel 10 via a cooler 11 to the top of the packed tower 9. From there it flows back to the vessel 10. After leaving the packed tower 9, the air passes through a stripper 12. The blower 13 conveys the air to a heat exchanger 14, where it is heated to the drying temperature by means of hot gases or liquids. The air is then recycled into the dryer 1 through line 5.

What we claim is:

1. A continuous process for drying moist, solid sodium cyanide which comprises suspending in a drying zone water-moist, solid sodium cyanide in the form of fine particles in a heated air stream having a temperature in the range of 100–500° C., withdrawing fine particles of essentially anhydrous, solid sodium cyanide from said zone, also adding more moist, solid sodium cyanide to said zone to replace the withdrawn essentially anhydrous sodium cyanide, and controlling the rate of withdrawal of essentially anhydrous sodium cyanide and rate of addition of moist, solid sodium cyanide to maintain in said drying zone an average water content of the sodium cyanide suspended therein below 0.5%.

2. A process as claimed in claim 1 wherein said average water content is maintained below 0.1%.

3. A process as claimed in claim 1 with the additional steps comprising discharging heated air stream from said drying zone, removing entrained dust particles from said discharged air stream, scrubbing said discharged air stream with cool, 30–50° by weight sodium hydroxide solution to remove water vapor from said air stream, and thereafter recycling the resultant air to said drying zone.

4. A process as claimed in claim 1 wherein said air stream is at a temperature in the range of 100–200° C.

5. A continuous process for drying moist, solid sodium cyanide which comprises suspending in a drying zone water-moist, solid sodium cyanide in the form of fine particles in a heated gas stream, said gas being air freed from its inherent carbon dioxide content, said gas stream having a temperature in the range of 100 to 500° C., withdrawing fine particles of essentially anhydrous, solid sodium cyanide from said zone, also adding more moist, solid sodium cyanide to said zone to replace the withdrawn, essentially anhydrous sodium cyanide, and controlling the rate of withdrawal of essentially anhydrous sodium cyanide and rate of addition of moist, solid sodium cyanide to maintain in said drying zone an average water content of the sodium cyanide suspended therein below 0.5%.

References Cited by the Examiner

UNITED STATES PATENTS

| | | | |
|---|---|---|---|
| 1,933,254 | 10/33 | Goodell. | |
| 2,121,020 | 6/38 | Christmann | 23—79 |
| 2,556,185 | 6/51 | Joscelyne | 159—47 |
| 2,567,959 | 9/51 | Munday. | |
| 2,635,684 | 4/53 | Joscelyne. | |
| 2,708,151 | 5/55 | McMinn | 23—79 |
| 2,729,428 | 1/56 | Milmore. | |
| 2,933,527 | 4/60 | Guyer et al. | |
| 3,015,539 | 1/62 | Snyder | 23—79 |
| 3,048,930 | 8/62 | Holzrichter et al. | 34—10 |

NORMAN YUDKOFF, *Primary Examiner.*